(12) United States Patent
Cornelius et al.

(10) Patent No.: US 8,683,190 B2
(45) Date of Patent: *Mar. 25, 2014

(54) CIRCUITRY FOR ACTIVE CABLE

(75) Inventors: William P. Cornelius, Los Gatos, CA (US); William O. Ferry, San Jose, CA (US); James E. Orr, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/480,345

(22) Filed: May 24, 2012

(65) Prior Publication Data

US 2012/0233489 A1 Sep. 13, 2012

Related U.S. Application Data

(63) Continuation of application No. 13/173,739, filed on Jun. 30, 2011, now Pat. No. 8,516,238.

(60) Provisional application No. 61/360,436, filed on Jun. 30, 2010, provisional application No. 61/360,432, filed on Jun. 30, 2010, provisional application No. 61/446,027, filed on Feb. 23, 2011.

(51) Int. Cl.
*G06F 9/00* (2006.01)

(52) U.S. Cl.
USPC ................ 713/100; 439/43; 710/62; 713/400

(58) Field of Classification Search
USPC ........................ 439/43; 710/62; 713/100, 400
See application file for complete search history.

(56) References Cited

U.S. PATENT DOCUMENTS

| | | |
|---|---|---|
| 3,581,143 A | 5/1971 | Dornfeld |
| 4,628,151 A | 12/1986 | Cardas |
| 5,228,035 A | 7/1993 | Hirato et al. |
| 5,313,465 A | 5/1994 | Perlman et al. |
| 5,711,686 A | 1/1998 | O'Sullivan et al. |
| 6,029,137 A | 2/2000 | Cordery et al. |
| 6,169,251 B1 | 1/2001 | Grant et al. |
| 6,485,335 B1 | 11/2002 | Dewdney |
| 6,495,763 B1 | 12/2002 | Eichmann et al. |
| 6,653,813 B2 | 11/2003 | Khatri |
| 6,792,474 B1 | 9/2004 | Hopprich et al. |
| 6,798,790 B1 | 9/2004 | Enssle et al. |
| 6,998,538 B1 | 2/2006 | Fetterolf, Sr. et al. |
| 7,033,219 B2 | 4/2006 | Gordon |

(Continued)

FOREIGN PATENT DOCUMENTS

| | | |
|---|---|---|
| CN | 201215850 Y | 4/2009 |
| CN | 202797544 U | 3/2013 |

(Continued)

OTHER PUBLICATIONS

Notice of Allowance for U.S. Appl. No. 12/239,743, mailed Feb. 19, 2013, 18 pages.

(Continued)

*Primary Examiner* — Albert Wang
(74) *Attorney, Agent, or Firm* — Kilpatrick Townsend & Stockton LLP

(57) ABSTRACT

Circuits, methods, and apparatus that allow signals that are compliant with multiple standards to share a common connector on an electronic device. An exemplary embodiment of the present invention provides a connector that provides signals compatible with a legacy standard in one mode and a newer standard in another mode.

20 Claims, 10 Drawing Sheets

(56) References Cited

U.S. PATENT DOCUMENTS

| | | |
|---|---|---|
| 7,174,413 B2 | 2/2007 | Pettey et al. |
| 7,188,209 B2 | 3/2007 | Pettey et al. |
| 7,197,549 B1 | 3/2007 | Salama et al. |
| 7,219,183 B2 | 5/2007 | Pettey et al. |
| 7,255,602 B1 | 8/2007 | Driessen et al. |
| 7,366,182 B2 | 4/2008 | O'Neill |
| 7,369,388 B2 | 5/2008 | Cheung et al. |
| 7,422,471 B1 | 9/2008 | Wu |
| 7,447,922 B1 | 11/2008 | Asbury et al. |
| 7,466,712 B2 | 12/2008 | Makishima et al. |
| 7,480,303 B1 | 1/2009 | Ngai |
| 7,561,855 B2 | 7/2009 | Hofmeister et al. |
| 7,562,176 B2 | 7/2009 | Kloeppner et al. |
| 7,587,575 B2 | 9/2009 | Moertl et al. |
| 7,689,755 B2 | 3/2010 | Balasubramanian et al. |
| 7,860,205 B1 | 12/2010 | Aweya et al. |
| 7,944,200 B2 | 5/2011 | Endo et al. |
| 8,312,302 B2 | 11/2012 | Baker et al. |
| 8,327,536 B2 | 12/2012 | Kim et al. |
| 8,380,912 B2 | 2/2013 | Jaramillo |
| 8,463,881 B1 | 6/2013 | Baker et al. |
| 8,516,238 B2 | 8/2013 | Cornelius et al. |
| 2002/0010799 A1 | 1/2002 | Kubota et al. |
| 2002/0093935 A1 | 7/2002 | Denney et al. |
| 2003/0030720 A1 | 2/2003 | Hutchings |
| 2003/0137997 A1 | 7/2003 | Keating |
| 2004/0023645 A1 | 2/2004 | Olsen et al. |
| 2004/0080544 A1 | 4/2004 | Stripling |
| 2004/0115988 A1 | 6/2004 | Wu |
| 2004/0196682 A1 | 10/2004 | Funaba et al. |
| 2005/0044236 A1 | 2/2005 | Stafford |
| 2005/0060470 A1 | 3/2005 | Main et al. |
| 2005/0060480 A1 | 3/2005 | Solomon |
| 2005/0111362 A1 | 5/2005 | Freytsis et al. |
| 2005/0147119 A1 | 7/2005 | Tofano |
| 2005/0238035 A1 | 10/2005 | Riley |
| 2005/0262269 A1 | 11/2005 | Pike |
| 2005/0281193 A1 | 12/2005 | Hofmeister et al. |
| 2006/0023386 A1 | 2/2006 | Palinkas et al. |
| 2006/0029038 A1 | 2/2006 | Jungck |
| 2006/0083518 A1 | 4/2006 | Lee et al. |
| 2006/0092928 A1 | 5/2006 | Pike et al. |
| 2006/0168387 A1 | 7/2006 | Gan et al. |
| 2006/0200600 A1 | 9/2006 | Groso |
| 2006/0206655 A1 | 9/2006 | Chappell et al. |
| 2006/0288098 A1 | 12/2006 | Singh et al. |
| 2007/0011536 A1 | 1/2007 | Khanna et al. |
| 2007/0025481 A1 | 2/2007 | Ryu et al. |
| 2007/0074891 A1 | 4/2007 | Burke |
| 2007/0086487 A1 | 4/2007 | Yasuda et al. |
| 2007/0208899 A1 | 9/2007 | Freking et al. |
| 2008/0079462 A1 | 4/2008 | Chiu et al. |
| 2008/0091857 A1 | 4/2008 | McDaniel |
| 2008/0117909 A1 | 5/2008 | Johnson |
| 2008/0123672 A1 | 5/2008 | Wilkinson |
| 2008/0147898 A1 | 6/2008 | Freimuth et al. |
| 2008/0172501 A1 | 7/2008 | Goodart et al. |
| 2008/0195747 A1 | 8/2008 | Elmaliah |
| 2008/0222338 A1 | 9/2008 | Balasubramanian |
| 2008/0250175 A1 | 10/2008 | Sheafor |
| 2008/0256445 A1 | 10/2008 | Olch et al. |
| 2008/0279186 A1 | 11/2008 | Winter et al. |
| 2008/0318348 A1 | 12/2008 | Grupen-Shemansky |
| 2009/0003335 A1 | 1/2009 | Biran et al. |
| 2009/0003361 A1 | 1/2009 | Bakthavathsalam |
| 2009/0006710 A1 | 1/2009 | Daniel et al. |
| 2009/0016348 A1 | 1/2009 | Norden et al. |
| 2009/0022176 A1 | 1/2009 | Nguyen |
| 2009/0037606 A1 | 2/2009 | Diab |
| 2009/0063701 A1 | 3/2009 | Bagepalli et al. |
| 2009/0070775 A1 | 3/2009 | Riley |
| 2009/0117754 A1 | 5/2009 | Fields et al. |
| 2009/0182917 A1 | 7/2009 | Kim |
| 2009/0222924 A1 | 9/2009 | Droz et al. |
| 2010/0014598 A1 | 1/2010 | Pfeifer |
| 2010/0046590 A1 | 2/2010 | Harper et al. |
| 2010/0085091 A1 | 4/2010 | Strazzieri et al. |
| 2010/0185792 A1 | 7/2010 | Yao et al. |
| 2011/0019383 A1 | 1/2011 | Aoyama et al. |
| 2011/0167187 A1 | 7/2011 | Crumlin et al. |
| 2011/0278043 A1 | 11/2011 | Ueda et al. |
| 2012/0000703 A1 | 1/2012 | Kim et al. |
| 2012/0000705 A1 | 1/2012 | Cornelius et al. |
| 2012/0005394 A1 | 1/2012 | Goodart et al. |
| 2012/0005496 A1 | 1/2012 | Baker et al. |
| 2012/0103651 A1 | 5/2012 | Kim |
| 2012/0104543 A1 | 5/2012 | Shahoian |
| 2012/0106018 A1 | 5/2012 | Shahohian et al. |
| 2012/0152613 A1 | 6/2012 | Kim et al. |
| 2012/0182223 A1 | 7/2012 | Zeng et al. |
| 2012/0226774 A1 | 9/2012 | Hochsprung |
| 2012/0233489 A1 | 9/2012 | Cornelius et al. |

FOREIGN PATENT DOCUMENTS

| | | |
|---|---|---|
| EP | 1202419 A1 | 5/2002 |
| EP | 2090955 A1 | 8/2009 |
| JP | H08-265600 | 10/1996 |
| JP | 2001-109697 A | 4/2001 |
| JP | 2003-189263 A | 7/2003 |
| JP | 2005-521368 A | 7/2005 |
| JP | 2005-309744 A | 11/2005 |
| JP | 2006-048594 A | 2/2006 |
| JP | 2007-251779 A | 9/2007 |
| JP | 2008-252310 A | 10/2008 |
| JP | 2009-123561 A | 6/2009 |
| WO | 2006/102606 A2 | 9/2006 |
| WO | 2006/102606 A3 | 9/2006 |
| WO | 2007/099507 A2 | 9/2007 |
| WO | 2009/039287 A2 | 3/2009 |
| WO | 2009/039287 A3 | 3/2009 |
| WO | 2009/046617 A1 | 4/2009 |
| WO | 2009/086566 A1 | 7/2009 |
| WO | 2010/051281 A2 | 5/2010 |
| WO | 2010/051281 A3 | 5/2010 |
| WO | 2012/003347 A1 | 1/2012 |
| WO | 2012/003381 A2 | 1/2012 |
| WO | 2012/003385 A1 | 1/2012 |

OTHER PUBLICATIONS

Notice of Allowance for U.S. Appl. No. 13/173,979, mailed on Jul. 11, 2012, 5 pages.

Non-Final Office Action for U.S. Appl. No. 13/615,642, mailed Apr. 12, 2013, 8 pages.

Final Office Action for U.S. Appl. No. 12/239,742, mailed on Oct. 15, 2010, 14 pages.

Final Office Action for U.S. Appl. No. 12/239,743, mailed on Nov. 12, 2010, 15 pages.

Non-Final Office Action for U.S. Appl. No. 12/239,742, mailed on Apr. 28, 2010, 14 pages.

Non-Final Office Action for U.S. Appl. No. 12/239,743 mailed on Jun. 21, 2012, 15 pages.

Non-Final Office Action for U.S. Appl. No. 12/239,743, mailed on May 25, 2010, 10 pages.

Non-Final Office Action for U.S. Appl. No. 13/173,979, mailed on Mar. 15, 2012, 8 pages.

Notice of Allowance for U.S. Appl. No. 13/033,562, mailed on Aug. 8, 2012, 9 pages.

Office Action for European Patent Application No. 11743164.3, mailed Mar. 5, 2013, 2 pages.

Office Action for Japanese Patent Application No. 2012-541240, mailed on Oct. 24, 2012, 3 pages.

Notice of Allowance for Japanese Patent Application No. 2012-541240, mailed on Apr. 30, 2013, 3 pages.

Office Action for Chinese Patent Application No. 201120235164.4, mailed on May 4, 2012, with English translation, 2 pages.

Notice of Allowance for Chinese Patent Application No. 201120235164.4, mailed on Sep. 17, 2012, with English translation, 4 pages.

(56) References Cited

OTHER PUBLICATIONS

Notice of Allowance for Chinese Patent Application No. 201120235144.7, mailed on Mar. 1, 2012, with English Translation, 4 pages.
Final Office Action mailed on Jul. 8, 2013 for U.S. Appl. No. 12/239,742, 14 pages.
Non-Final Office Action mailed on Jul. 9, 2013 for U.S. Appl. No. 13/033,542, 16 pages.
Non-Final Office Action mailed on Jul. 9, 2013 for U.S. Appl. No. 13/033,553, 17 pages.
Non-Final Office Action for U.S. Appl. No. 12/239,742, mailed on Dec. 7, 2012, 10 pages.
Office Action for Japanese Patent Application No. 2012-543350, mailed on Dec. 28, 2012, in 4 pages.
International Preliminary Report on Patentability for PCT Application No. PCT/US2011/042634, mailed on Jan. 17, 2013, 12 pages.
International Preliminary Report on Patentability for PCT Application No. PCT/US2011/042689, mailed on Jan. 17, 2013, 7 pages.
Notice of Allowance for U.S. Appl. No. 13/173,739, mailed May 13, 2013, 29 pages.
Notice of Allowance for Japanese Patent Application No. 2012-543350, mailed on Mar. 12, 2013, in 4 pages.
International Preliminary Report on Patentability for PCT Application No. PCT/US2011/042684, mailed on Jan. 17, 2013, 12 pages.
Display Port, Wikipedia, the free encyclopedia, 4 pages; printed on Aug. 29, 2008 from http://en.wikipedia.org/wiki/Displayport; page states it was last modified on Aug. 25, 2008.
Dopplinger, A., et al. "Using IEEE 1588 for synchronization of network-connected devices", Mar. 29, 2007, from www.embedded.com/columns/technicalinsights/, 7 pages.
Ethernet, Wikipedia, the free encyclopedia, 9 pages; printed on Aug. 17, 2008, from http://en.wikipedia.org/wiki/Ethernet; page states it was last modified on Aug. 17, 2008.
IDT 24-Lane 3-Port PCI Express, 89HPES24N3 Data Sheet, Jul. 18, 2006, 30 pages.
IEEE 1394 interface, Wikipedia, the free encyclopedia, 7 pages; printed on Jul. 24, 2008 from http://en.wikipedia.org/wiki/Firewire; page states it was last modified on Jul. 23, 2008.
PCI Express, Wikipedia, the free encyclopedia, 11 pages; printed on Jul. 24, 2008 from http://en.wikipedia.org/wiki/PCI-Express; page states it was last modified on Jul. 16, 2008.
PCI Express Architecture, Chapter 3, Address Spaces & Transaction Routing, from PCIEX.book, pp. 105-152, Aug. 5, 2003.
PCI Express Base Specification Revision 1.0a, Apr. 15, 2003, pp. 1-426.
PCI-X, Wikipedia, the free encyclopedia, 4 pages; printed on Sep. 9, 2008 from http://en.wikipedia.org/wiki/PCI-X; page states it was last modified on Sep. 4, 2008.
Peer-to-peer, Wikipedia, the free encyclopedia, 11 pages; printed on Sep. 24, 2008 from http://en.wikipedia.org/wiki/Peer-to-peer; page states it was last modified on Jul. 24, 2008.
Peripheral Component Interconnect, Wikipedia, the free encyclopedia, 7 pages; printed on Jul. 24, 2008, from http://en.wikipedia.org/wiki/PCI_%28bus%29; page states it was last modified on Jul. 23, 2008.
Universal Serial Bus, Wikipedia, the free encyclopedia, 17 pages; printed on Jul. 24, 2008 from http://en.wikipedia.org/wiki/USB; page states it was last modified on Jul. 23, 2008.
VESA DisplayPort Standard, Version 1, Revision 1a, Jan. 11, 2008, 238 pages.
International Search Report and Written Opinion for Application No. PCT/US2011/042634 mailed on Nov. 30, 2011, 20 pages.
International Search Report and Written Opinion for Application No. PCT/US2011/042684 mailed on Jan. 31, 2012, 18 pages.
International Search Report and Written Opinion for Application No. PCT/US2011/042689 mailed on Sep. 28, 2011, 23 pages.
Office Action for Chinese Patent Application No. 201110189140.4, mailed on Aug. 19, 2013, 11 pages.
Non-Final Office Action for U.S. Appl. No. 13/403,182, mailed Dec. 20, 2013, 14 pages.
Office Action for Korean Patent Application No. 10-2012-7032488, mailed on Oct. 31, 2013, with English translation, 6 pages.
Non-Final Office Action mailed on Sep. 9, 2013 for U.S. Appl. No. 13/249,260, 21 pages.
Chinese Office Action mailed on Sep. 24, 2013 for CN Patent Application No. 201110189138.7, with English Translation, 10 pages.
Non-Final Office Action mailed on Oct. 3, 2013 for U.S. Appl. No. 13/403,209, 18 pages.
Salvator, Dave; "Business Wire on Intel Announces Thunderbold Technology,"; Feb. 24, 2013, 3 pages.
Pang, Tiffany; TI Introduces High-Performance, Dual-Mode DisplayPort Switches and DHMI/DVI Level Translations; Connects new PC Video Standard to Monitors and TVs, Mar. 11, 2008, 3 pages.
Texas Instruments; "DisplayPort Switch,"; Feb. 2008, 25 pages.
Texas Instruments; "DisplayPort Switch,"; Jan. 2008, revised Mar. 2008, 56 pages.
Final Office Action for U.S. Appl. No. 13/615,642, mailed Oct. 23, 2013, 22 pages.

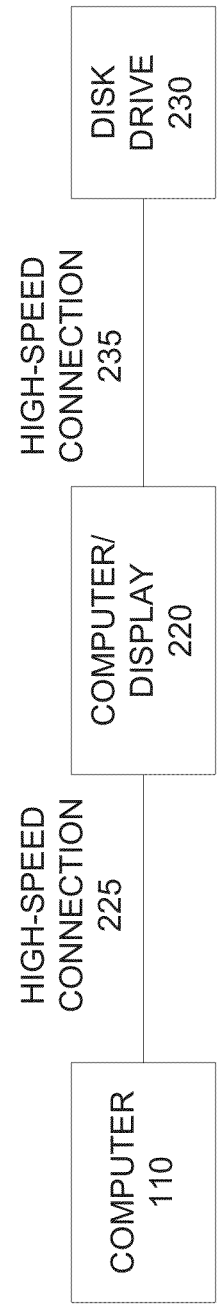

| | SOURCE / HOST | CABLE | SINK / ENDPOINT |
|---|---|---|---|
| 410 | DP    CFG1 = 1 Meg pull-down<br>       CFG2 = 1 Meg pull-down | PASSIVE | DP    Operates as DP |
| 420 | DP    CFG1 = 1 Meg pull-down<br>       CFG2 = 1 Meg pull-down | PASSIVE | HSIO    Does not see pull up on LSx pin, does not operate. |
| 430 | DP    CFG1 = 1 Meg pull-down<br>       CFG2 = 1 Meg pull-down | ADAPTER<br>CFG1 = 100 k pull-up | Can be HDMI or DVI. |
| 440 | HSIO    CFG1 = 1 Meg pull-down<br>         CFG2 = 1 Meg pull-down<br>Does not detect pull-up on CFG2, operates as DP. | PASSIVE | DP    Operates as DP |
| 450 | HSIO    CFG1 = 1 Meg pull-down<br>         CFG2 = 1 Meg pull-down<br>CFG 1 remains low and detects pull-up on CFG2, operates as HSIO. | ACTIVE<br>CFG2 = 100 k pull-up. | HSIO    CFG1 = 1 Meg pull-down<br>         CFG2 = 1 Meg pull-down<br>CFG 1 remains low and detects pull-up on CFG2, operates as HSIO. |
| 460 | HSIO    CFG1 = 1 Meg pull-down<br>         CFG2 = 1 Meg pull-down<br>Detects pull-up on CFG1, operates as HDMI or DVI. | ADAPTER<br>CFG1 = 100 k pull-up. | Can be HDMI or DVI. |

FIGURE 4

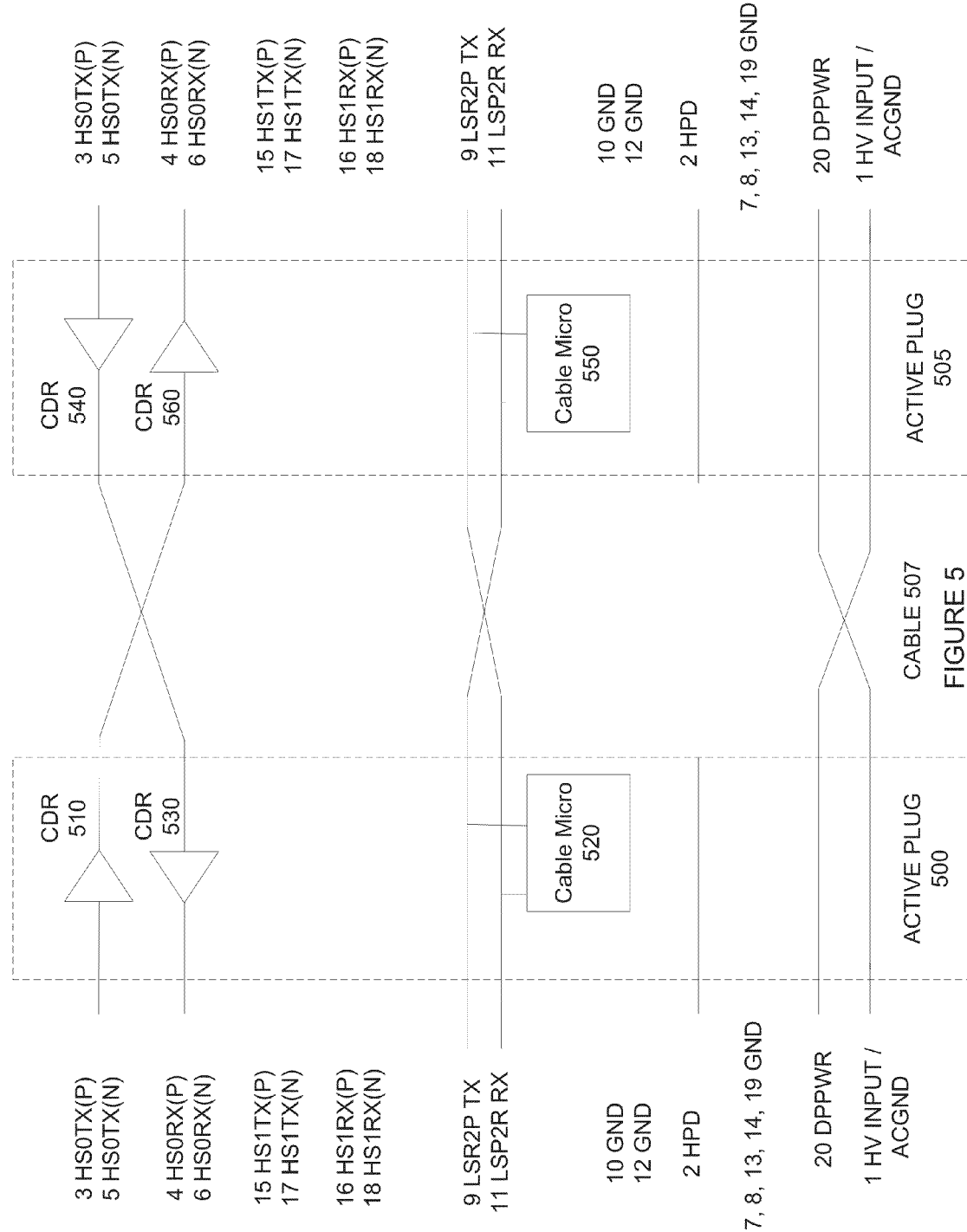

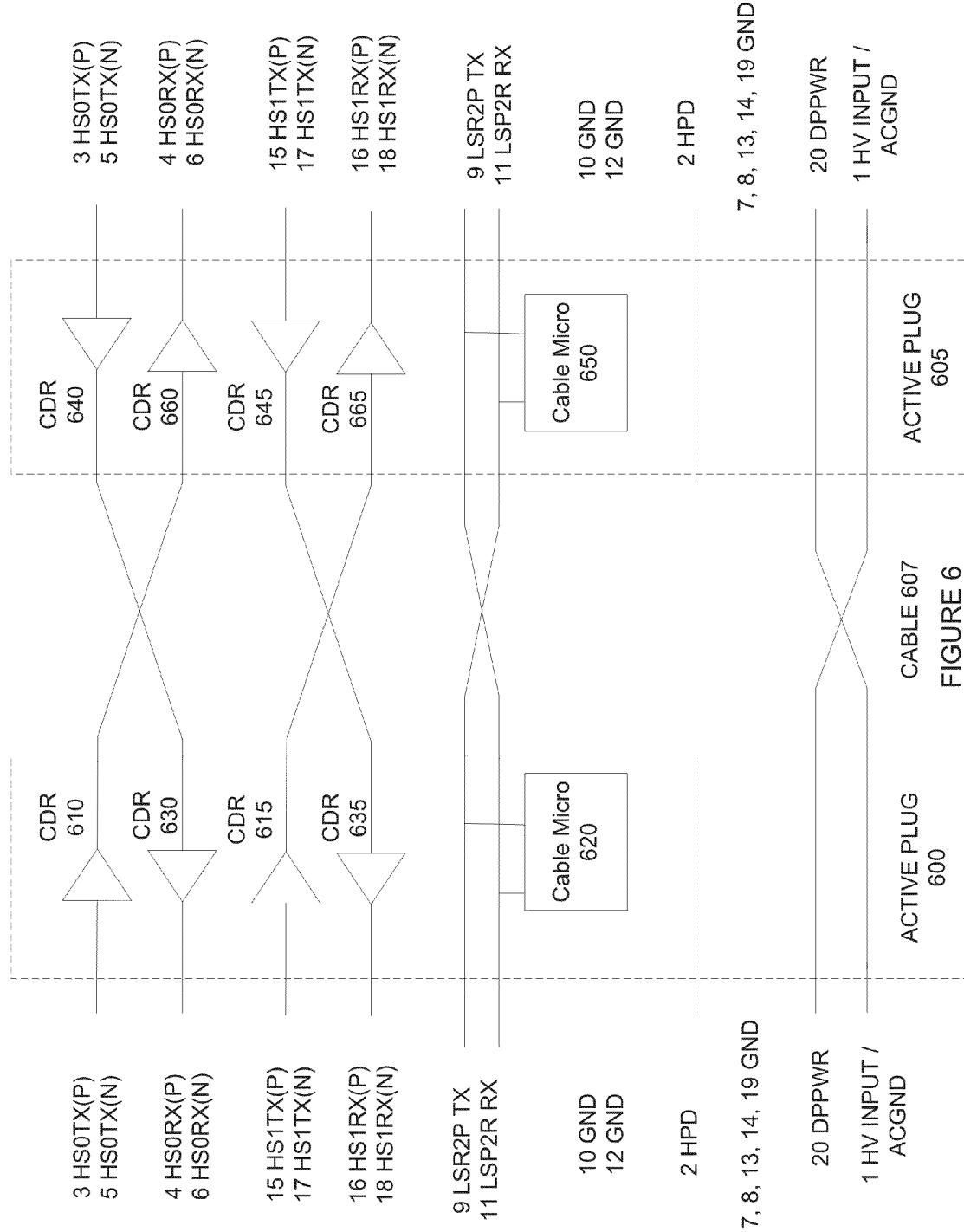

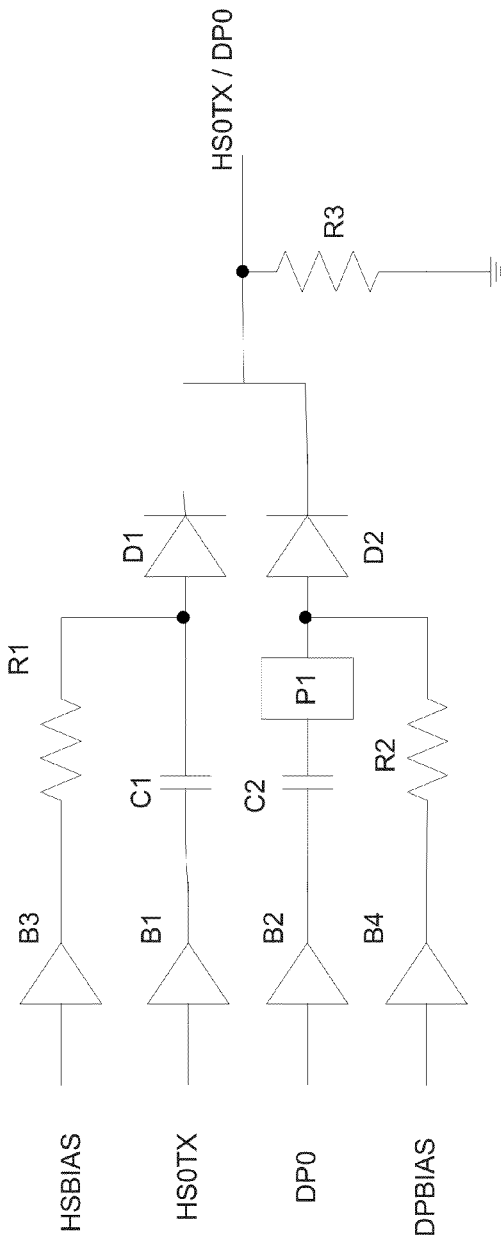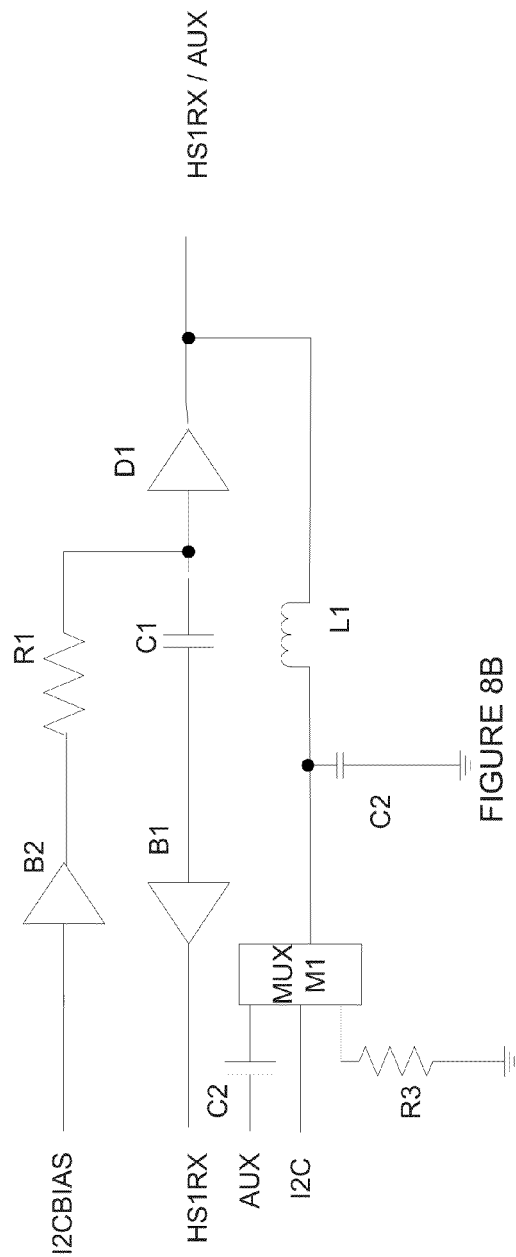

| | SOURCE / HOST | TETHERED CABLE | DISPLAY |
|---|---|---|---|
| 910 | DP    CFG1 = 1 Meg pull-down<br>       CFG2 = 1 Meg pull-down | Passive. | DP    Operates in DP. |
| 920 | DP    CFG1 = 1 Meg pull-down<br>       CFG2 = 1 Meg pull-down<br>       No pull-up on LSx pin | Operates in bypass mode. | HSIO   Drives CFG2 low and operates in DP. |
| 930 | HSIO   CFG1 = 1 Meg pull-down<br>         CFG2 = 1 Meg pull-down<br>Does not detect pull-up on CFG2, but does detect CFG1 low, so operates as DP. | Passive. | DP    Operates in DP. |
| 940 | HSIO   CFG1 = 1 Meg pull-down<br>         CFG2 = 1 Meg pull-down<br>Provides pull-up on LSx pin | Operates in active mode. | HSIO   Detects pull-up on LSx pin, drives CFG2 high. |

FIGURE 9

CIRCUITRY FOR ACTIVE CABLE

CROSS-REFERENCES TO RELATED APPLICATIONS

This application is a continuation of U.S. patent application Ser. No. 13/173,739, filed Jun. 30, 20111 which claims the benefit of U.S. Provisional Patent Applications Nos. 61/360,436, filed Jun. 30, 2010, 61/360,432, filed Jun. 30, 2010, and 61/446,027, filed Feb. 23, 2011, and is related to co-pending U.S. patent application Ser. No. 13/173,979, filed Jun. 30, 2011 which are incorporated by reference.

BACKGROUND

Electronic devices often include connectors to provide ports where power and data signals can be shared with other devices. These connectors are often designed to be compliant with a standard, such that the electronic devices can communicate with each other in a reliable manner. The various Universal Serial Bus (USB), Peripheral Component Interconnect Express (PCIe), and DisplayPort (DP) standards are but a few examples.

On occasion, the standards that use these connectors are replaced by newer standards. As a result, multiple connectors that provide similar functions are often included on an electronic device. For example, many current televisions include inputs for HDMI, S-video, component video, and RCA jacks.

The inclusion of these connectors increases device size, complexity, and cost. Also, the inclusion of several options can cause confusion and frustration for customers as they try to determine the best way to configure a particular system.

Some of this confusion could be reduced if one connector was able to provide signals for more than one standard. For example, if one connector could provide signals for both a legacy standard and a newer standard, the number of connectors on an electronic device could be reduced, thereby enabling the device to be made smaller, simpler, and less expensive.

But as helpful as this would be, it is very difficult to do. For example, circuits associated with one standard may interfere with circuits associated with another standard. This becomes even more difficult when data rates are high, as reflections and termination mismatches caused by unused circuits impair the performance of the circuits being used.

For example, a newer, faster standard may share a connector with a legacy, slower standard. Circuitry necessary for the legacy standard may cause reflections and termination mismatches for the circuits for the newer, faster standard, thereby degrading system performance.

Thus, what is needed are circuits, methods, and apparatus that allow various standards to share a common connector.

SUMMARY

Accordingly, embodiments of the present invention provide circuits, methods, and apparatus that allow signals that are compliant with multiple standards to share a common connector on an electronic device. An exemplary embodiment of the present invention may provide a connector that provides signals compatible with a legacy standard in one mode and a newer standard in another mode. Typically, the legacy standard is slower, while the newer standard is faster, though this may not always be true.

In an exemplary embodiment of the invention, the pins for the newer standard may be arranged to achieve at least two goals. First, they may be arranged to reduce crosstalk and interference among themselves. This may be accomplished by placing several ground pins between high-speed differential signal paths. Second, circuitry may be added such that interference from circuits for the legacy standard is minimized. This may be done by reducing reflection and impedance mismatches.

An exemplary embodiment of the present invention is able to provide multiple data standards by incorporating various features. In one exemplary embodiment of the present invention, devices that are compatible with the newer standard may be capable of determining whether they are communicating with a device that is compatible with a legacy standard, or a newer standard. This may be done by a first device sensing voltages or impedances provided by a second device.

In various embodiments of the present invention, when two devices in communication are capable of communicating with the newer standard, that standard may be used by both devices. Where one device is only capable of operating with the legacy standard, that standard may be used by both devices.

Embodiments of the present invention may provide circuits to isolate unused circuitry for one standard from operating circuitry for the other standard. In a specific example, resistors, PiN diodes, multiplexers, or other components or circuits may be used to isolate two transmitter circuits from each other. Coupling capacitors and inductors may be used as DC blocks and AC filters to isolate circuits.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIG. 1 illustrates a legacy system that may be improved by the incorporation of embodiments of the present invention;

FIG. 2 illustrates a computer system according to an embodiment of the present invention;

FIG. 4 illustrates circuits and methods used in determining the types of devices in communication with each other according to an embodiment of the present invention;

FIG. 5 illustrates an active cable consistent with an embodiment of the present invention;

FIG. 6 illustrates an active cable consistent with an embodiment of the present invention;

FIGS. 8A and 8B illustrate alternate circuits that may be used to allow signal paths from two different standards to share common pins of a connector;

FIG. 9 illustrates circuits and methods used by devices in determining what types of devices they are connected to;

DESCRIPTION OF ILLUSTRATIVE EMBODIMENTS

Figure 3:
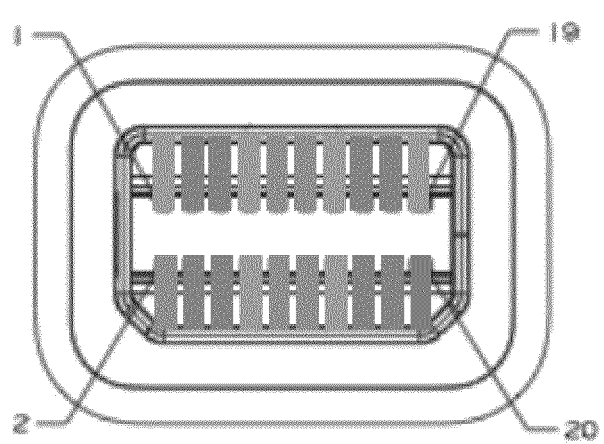
FIG. 3 illustrates a pinout of a connector according to an embodiment of the present invention.

FIG. 1 illustrates a legacy system that may be improved by the incorporation of embodiments of the present invention. This figure illustrates computer 110 in communication with legacy display 120 over legacy connection 115. In a specific embodiment of the present invention, legacy connection 115 is a DisplayPort connection, though in other embodiments of the present invention, other connections may be used.

In this figure, connection 115 is shown as a legacy connection. In other embodiments of the present invention, connection 115 may also be a new type of connection. Also, while computer 110 is shown communicating with display 120, other types of connections may be improved by the incorporation of embodiments of the present invention. For example, a connection may be provided between a portable media player and a display, a computer and a portable media player, or between other types of devices. In various embodiments of the present invention, computer 110, display 120, and the other devices shown or discussed may be manufactured by Apple Inc. of Cupertino, Calif.

Again, it may be desirable for computer 110 to be able to drive either a legacy display, such as display 120, or any newer computer, display, or other type of device. Typically, this requires the addition of another connector on computer 110. This may be undesirable, as it adds complexity, cost, and size to the computer 110. The addition of another connector may also increase consumer confusion.

Accordingly, embodiments of the present invention may provide a newer connection using the same connector as legacy connection 115. An example is shown in the following figure.

FIG. 2 illustrates a computer system according to an embodiment of the present invention. This figure, as with the other included figures, is shown for illustrative purposes and does not limit either the embodiments of the present invention or the claims.

This figure illustrates computer 110 communicating with computer or display 220 over high-speed connection 225. Computer or display 220 communicates with disk drive 230 over high-speed connection 235. Computer 110 may use the same connector to form a legacy connection 115 in FIG. 1 and high-speed connection 225 in FIG. 2. As shown, the high-speed connection provided by computer 110 may be daisy-chained to multiple devices. In this configuration, each high-speed connection 225 and 235 shares the bandwidth available at the connector of computer 110.

By providing a connector on computer 110 that can support legacy connection 115 in FIG. 1 and high-speed connection 225 in FIG. 2, the number of connectors on computer 110 is reduced. This reduces device size, saves money, and eases consumer confusion. In this example, computer 110 communicates with computer or display 220 and disk drive 230. In other embodiments of the present invention, other types of devices may be employed. For example, computer 110 may drive a display of an all-in-one computer, a second computer, a stand-alone monitor, an expansion device, a raid drive, or other type of device.

An embodiment of the present invention may account for at least two considerations when arranging pinouts for a high-speed connection using an existing legacy connector. First, signals in different channels of the high-speed connection may be arranged such that they do not interfere with each other. That is, cross talk between high-speed signals may be reduced and the signals may be isolated. Second, circuitry to drive and receive the new, high-speed signals and circuitry associated with the legacy standard may be isolated to limit interference between them. An example is shown in the following figure.

FIG. 3 illustrates a pinout of a connector according to an embodiment of the present invention. In this example, DisplayPort is the legacy standard, which has been overlaid with pins for a new standard. This new standard may be referred to as T29, but is generally identified elsewhere in this document as HSIO. In other embodiments of the present invention, other standards may be used. Also, one or both of these standards may be legacy standards, or one or both of these standards may be newer standards. Also, while two standards are shown here as sharing a connector, in other embodiments of the present invention, other numbers of standards may share a connector.

In various embodiments of the present invention, the two standards may be separate and unrelated. In other embodiments of the present invention, they may be related. For example, HSIO may be a high-speed signaling technique that carries DisplayPort information. That is, DisplayPort information may tunnel using HSIO signals. HSIO may also carry other types of signal information at the same time, such as PCIe information. In this way, the connector in FIG. 3 may carry DisplayPort signals directly, or it may carry DisplayPort information that is conveyed as HSIO signals. It should be noted that in various embodiments of the present invention described below, HSIO is also referred to as T29.

In this arrangement, the high-speed input and output pins may be isolated from one another. Specifically, high-speed receive signals may be placed on pins 4 and 6, and 16 and 18. Each of these pairs of signals may be isolated by signals that are AC grounds. For example, high-speed receive pins 4 and 6 may be isolated by hot plug detect pin 2 and ground pin 8. Similarly, high-speed receive pins 16 and 18 may be isolated by ground 14 and power pin 20. High-speed transmit pins 3 and 5, and 15 and 17, may be isolated by ground pins 1, 7, 13, and 19.

Some or all of the ground pins, such as pins 1 and 7, may be AC grounds, as opposed to a direct DC connection to ground. That is, these pins may be coupled through a capacitor to ground. This provides a ground connection at high frequencies, while providing an open at low frequencies. This arrangement allows power supplies to be received at these pins, while maintaining a ground at high frequency.

In a specific embodiment of the present invention, pin 20 at a first end of cable connects to pin 1 at a second end of the cable. This allows power provided on pin 20 by a host device to be supplied to pin 1 at a device connection. Since pin 1 is coupled to ground through a capacitor, the DC power may be received, though pin 1 provides an AC ground.

Also in this arrangement, the high-speed signals in the high-speed HSIO standard may share pins with appropriate signals of the legacy DisplayPort standard. Specifically, the high-speed receive signals on pins 4 and 6 may share pins with configuration signals in the DisplayPort standard. High-speed receive signals on pins 16 and 18 may share pins with auxiliary signals in the DisplayPort standard. High-speed transmit signals on pins 3 and 5 may share pins with DisplayPort output signals, as may the high-speed transmit signals on pins 15 and 17.

Since these connectors may support devices using either the DisplayPort or HSIO standards, there are at least four possible configurations when two devices communicate with each other. For example, a DisplayPort host device may communicate with a DisplayPort or an HSIO device. Also, an HSIO host device may communicate with either a DisplayPort or another HSIO device. Accordingly, devices compatible with the newer HSIO standard may be able to determine which type of device they are in communication with. Once the configuration is known, the devices may be configured appropriately. An example is shown in the following figure.

FIG. 4 illustrates circuits and methods used in determining the types of devices in communication with each other according to an embodiment of the present invention. In line 410, a DisplayPort source or host is communicating with a DisplayPort sink or endpoint. A DisplayPort source or host provides pull-down resistors on configuration pins CFG1 and CFG2. In this example, the pull-downs are shown as 1 Meg in size, though this may vary consistent with embodiments of the present invention. The DisplayPort source or host is connected through a passive cable to a DisplayPort sink or endpoint. The DisplayPort sink or endpoint may operate as a DP device.

In line 420, a DisplayPort source or host communicates with an HSIO sink or endpoint. In this specific embodiment of the present invention, an HSIO sink or endpoint will not operate under these conditions, though in other embodiments of the present invention, when the HSIO sink or endpoint is a display, the HSIO sink or endpoint may act as a DisplayPort sink or endpoint.

In line 430, a cable adapter is connected to a DisplayPort source or host. The cable adapter has a pull up on configuration pin CFG2 that is much smaller than the pull-down resistor in the source or host. Accordingly, the voltage on configuration pin CFG2 is pulled high. The cable adapter may provide signals to an HDMI or DVI type of sink or endpoint.

In line 440, an HSIO source or host communicates with a DisplayPort sink or endpoint via a passive cable. The HSIO source or host has pull downs on configuration pins CFG1 and CFG2. In this example, the pull-down resistors have a value of 1 Meg, though other sizes resistors may be used consistent with embodiments of the present invention. In this case, the HSIO source or host does not detect a pull up on configuration pin CFG2, and accordingly the HSIO source or host operates as a DisplayPort device.

In line 450, an HSIO source or host communicates with an HSIO sink or endpoint. In this configuration, an active cable is required between the HSIO source or host and the HSIO sink or endpoint. The active cable has a 100 K pull up on configuration pin CFG2, which provides a high voltage on pin CFG2. Both the HSIO source or host and HSIO sink or endpoint detect this level and may operate as an HSIO device.

In line 460, a cable adapter is connected to an HSIO source or host. The cable adapter has a pull up on configuration pin CFG2 that is much smaller than the pull-down resistor in the source or host. Accordingly, the voltage on configuration pin CFG2 is pulled high. The cable adapter may provide signals to an HDMI or DVI type of sink or endpoint.

In various embodiments of the present invention, it is desirable to increase the power level provided by the source of host and sink or endpoint. In one specific embodiment of the present invention, this is accomplished using an LSx bus, as is further described below. In another specific embodiment of the present invention, this is accomplished by providing a 1K pull down on configuration pin CFG1 in the cable. This is detected by the HSIO source or host and HSIO sink or endpoint, for example, by providing a small current into the configuration pin. If the voltage remains low, the pull-down resistor is small, and a high voltage mode is enabled. If the resistance of the pull-down resistor is high, the resulting voltage will be high, and the high-voltage mode is not enabled.

In various embodiments of the present invention, it is desirable to exit this high-power mode under some circumstances in order to protect connected devices. Accordingly, if a cable is pulled, power is withdrawn from a device, or other such condition occurs, the high-power stage may be exited. In a specific embodiment of the present invention, the low-power state may include providing a supply voltage of 3.3 V, while the high-power state may include providing a supply of 12 volts. In various embodiments of the present invention, these voltages may be different, and they may also vary depending on various conditions, such as the amount of line loss. To further save power, the cable may enter a sleep mode once a period of inactivity has been detected.

Again, to support a high-speed standard, an active cable may be required. This cable may have the ability to retime data at each of its ends so as to provide easily recoverable data by an HSIO source or host and an HSIO sink or endpoint. An example of such a cable is shown in the following figure.

FIG. 5 illustrates an active cable consistent with an embodiment of the present invention. For simplicity, only circuitry associated with the high-speed operation is shown. This cable includes two active plugs 500 and 505, one on each end of cable 507. Each active plug includes dual clock and data recovery circuits for retiming data. Specifically, active plug 500 provides high-speed transmission signals on pins 3 and 5, and receives high-speed signals on pins 4 and 6. A cable microcontroller 520 may be used to configure clock and data recovery circuits 510 and 530 in active plug 500.

Similarly, active plug 505 provides high-speed transmission signals on pins 3 and 5, and receives high-speed signals on pins 4 and 6. A cable microcontroller 550 may be used to configure clock and data recovery circuits 540 and 560.

The clock and data recovery circuits may provide and receive signals in a variety of formats. For example, these circuits may include optical receivers and transmitters, such that cable 507 becomes a mix of fiber optic and electrical wires.

In various embodiments of the present invention, the clock and data recovery circuits may employ equalizer circuits, buffers, emphasis, and de-emphasis circuits as appropriate. Also, loopback paths may be included for diagnostic purposes. For example, the output of CDR 510 may be connected as an input to CDR 530, while the output of CDR 540 may be an input to CDR 560. This loopback path allows an HSIO device to determine the location of transmission errors as they arise. This loopback path may also be used in training or calibration routines, as described below. In other embodiments, the cable can self-communicate from end-to-end for diagnostic purposes. Other features that may be included for diagnostics include eye size measurements.

In various embodiments of the present invention, the cable may be configured. In this specific embodiment of the present invention, circuitry in cable plug 500 may be configured using cable microcontroller 520, while circuitry in cable plug 505 may be configured using cable microcontroller 550. In other embodiments in the present invention, other circuits may be used to configure either or both plugs 500 and 505.

In this specific embodiment of the present invention, operational parameters, modes, and other aspects and characteristics of the plug circuitry may be configured. Information for this configuration may include parameters for control, diagnostics, tests, configuration, circuit monitoring, as well as other parameters. The ability to configure a cable in this way allows cables to adapt to new hosts and devices as the cable is used in various system applications.

Information regarding the identification of cable type, vendor, and other identifying information may be available from hosts or devices and cables. Exchange of this information may be used to properly configure and drive circuitry in hosts or devices as well as cables.

In this specific embodiment of the present invention, configuration and identification information may be read from and written to the cable using LSx signals on pins 9 and 11, though in other embodiments of the present invention, other signal pins may be used.

In various embodiments of the present invention, code in the cable microcontrollers 520 and 550 may be changed, reconfigured, upgraded, or updated. This code may be encrypted for security reasons. Also, data provided during a code change, reconfiguration, or update may be encrypted as well.

Also in various embodiments of the present invention, cable microcontrollers may be in communication with port microcontrollers in devices (not shown) that are communicating over the cable. In a specific embodiment of the present invention, a port microcontroller in a first device may communicate directly with a cable microcontroller in the plug inserted in the first device, as well as a port microcontroller in a remote device attached to the remote plug. Further communication may be had with the remote or far-end plug by "bouncing" messages of the port microcontroller in the remote device.

These communications between port and cable microcontrollers may take various forms. Traditionally, interconnections were fixed at each end, with little opportunity for discovery of improved capabilities or flexible implementations. Accordingly, embodiments of the present invention provide this ability to communicate, such that, for example, a cable may share information regarding its features to a host or device, and the host or device may utilize such features.

In other examples, these communications between the various port and cable microcontrollers may be diagnostic in nature. These diagnostic communications may aid in the isolation of faults, by an end user or other, which may allow rapid remediation of issues and may focus attention on devices causing the fault. These communications may be useful in test and manufacturing as well. They may also be used to optimize the configuration for power savings, for example, a channel that is not used may be powered down, a low-power remote device may be powered by a host, such that the device does not require a connection to a wall-outlet. Also, power consumed by remote devices may be monitored, and power increases (or decreases) may be enabled as needed. They may also allow devices to continue to operate despite various impairments. They may also enable the use of either copper or other conductor, or fiber optics in the cable itself.

Again, in various embodiments of the present invention, a cable may provide pull-ups on configure pins CFG1 and CFG2, while devices attached by the cable may provide pull ups on their LSR2PTX pins. (The pull-up on an LSR2PTX pin may be seen by a remote device on its LSP2R RX pin due to the crossover of these lines in the cable, as shown.) The pull-up on CFG2 may allow a device to determine that a cable is attached, even when there is no remote device. In a specific embodiment of the present invention, when a cable is present without a remote device, a near device may communicate with a cable microcontroller in its plug, but may not be able to communicate with a cable microcontroller in the remote plug, since there is no remote device to bounce messages.

These various pull-ups may be used to provide other features in various embodiments of the present invention. For example, in some embodiments of the present invention, it may be useful to detect when a host device is disconnected from one or more devices. For example, it may be desirable for a host device to provide a power-down signal to one or more devices when a host device is powered down. But a host may be disconnected before it is able to send such a signal. In this case, the absence of a pull-up on an LSR2PTX pin may be detected by a device and used by the device as an indication that it should power down.

Specifically, a host device may enable its pull-up on its LSR2PTX, while devices pull their pull-ups on their LSR2PTX pins low. If a device sees a pull-up on its LSP2R RX pin, it knows it is connected to a host device. It can then enable pull-up on LSR2PTX pins on each of its ports, thereby informing daisy-chained devices that there is a host connected somewhere upstream. In this way, when the host is removed, the pull-up on the LSR2PTX is removed, and the device again pull its LSR2PTX pull-ups low, thereby informing daisy-chained devices that the host has been disconnected.

As shown in this figure, power received on pin 20 at one connector is provided at pin 1 of the far connector. This prevents power supplies of devices connected to each end of the cable from coming into contention with each other. Instead, power on pin 20 of a first connector is provided to a second connector on pin 1.

In the example cable of FIG. 5, a single data path in each direction is shown. In other embodiments of the present invention, two or more signal paths may be included. An example is shown in the following figure.

FIG. 6 illustrates an active cable consistent with an embodiment of the present invention. Again, only circuitry associated with the high-speed paths is shown for simplicity. In this example, additional clock and data recovery circuits 615 and 635 have been added to active plug 600, while clock and data recovery circuits 645 and 665 have been added to active plug 605.

In these and other embodiments of the present invention, circuitry in the plugs may be powered by one or both of the devices being connected by the cable. For example, a host device connected to plug 600 may provide power for plugs 600 and 605, as well as a host connected to plug 605. In other examples, a device connected to plug 605 may receive a high voltage from a host connected to plug 600, the device may provide power to plugs 600 and 605. In still other examples, a host connected to plug 600 may provide power to plug 600 and a device connected to plug 605 may provide power to plug 605. Specific examples of this can be found in co-pending U.S. patent application Ser. No. 13/173,979, titled Power Distribution Inside Cable, which is incorporated by reference.

Again, embodiments of the present invention allow signals sharing pins between the two standards to not interfere with each other. Accordingly, embodiments of the present invention employ circuit components to help isolate the signal paths. Examples are shown in the following figures.

Figure 7A:
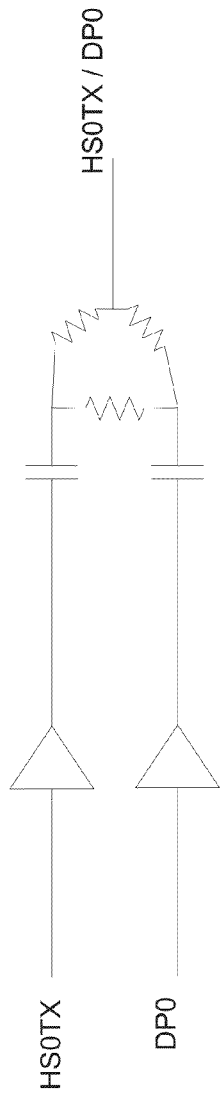
FIGS. 7A-7C illustrate circuits that may be used to allow signal paths from two different standards to share common pins of a connector.
Figure 7B:
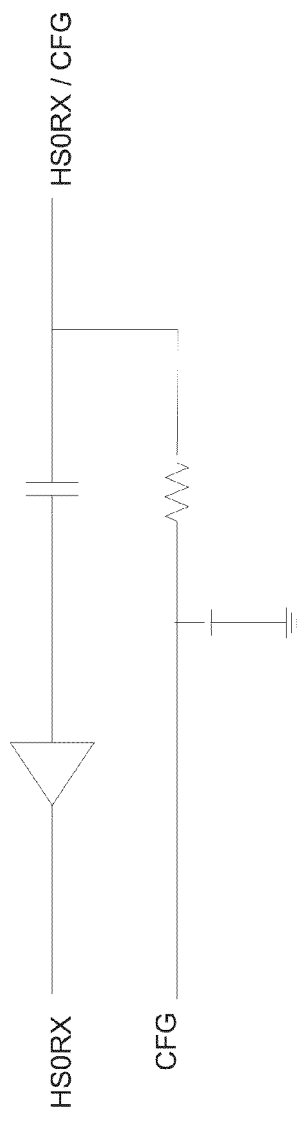
Figure 7C:
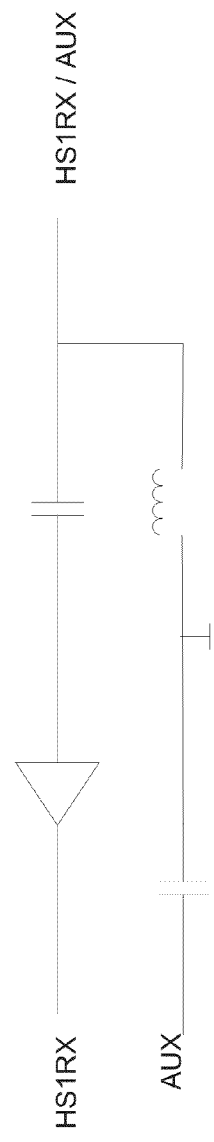

FIGS. 7A-7C illustrate circuits that may be used to allow signals paths from two different standards to share common pins of a connector. In various embodiments of the present invention, these circuits may be located in, or associated with, a connector receptacle, a connector insert, or both. In FIG. 7A, an HSIO output may share a pin with a DisplayPort output. In this case, both outputs may be AC coupled through a capacitor to provide DC isolation from each other. The capacitors may connect through a resistor network as shown to a connector pin. This resistor network degrades signal levels by 6 dB, but provides 12 dB of isolation.

In FIG. 7B, a high-speed input and a configuration input may share a connector pin. In this case, the high-speed receive path may be AC coupled to provide isolation to the DC voltage on the configuration pin. The configuration pin may be isolated through a resistor. An additional capacitor may be included to provide further filtering, as shown. In other embodiments of the present invention, the configuration pin may be directly coupled to the connector pin.

In FIG. 7C, a high-speed input may share a pin with an auxiliary input. Again, the high-speed input may be AC coupled to provide a DC block. The auxiliary pin may be isolated through an inductor, which may block AC signals (such as high-speed signals in the 70 Mbps to 10 Gbps) while allowing DC or low frequency signals (such as signals at 1 MHz or lower) to pass. Again, an additional capacitor may be included to provide further filtering, as shown. Also, the AUX input may be AC coupled, as shown.

FIGS. 8A and 8B illustrate alternate circuits that may be used to allow signal paths from two different standards to share common pins of a connector. In various embodiments of the present invention, these circuits may be located in, or associated with, a connector receptacle, a connector insert, or both. In FIG. 8A, an HSIO output may share a pin with a DisplayPort output. In this example, both outputs may be AC coupled through capacitors C1 and C2 to provide DC isolation from each other. The capacitors C1 and C2 may couple via PiN diodes D1 and D2 to a connector pin.

Specifically, when the high-speed output is active, the high-speed bias signal HSBIAS is active, driving the output of buffer B3 high. This biases PiN diode D1 on and connects capacitor C1 to a connector pin. Driver B1 drives an output signal through capacitors C1 and diode D1 to the connector pin.

When the DisplayPort output as active, the DisplayPort bias signal DPBIAS is active, driving the output of buffer B4 high. This biases PiN diode D2, such that it turns on and connects an output of capacitor C2 to the connector pin. Driver B2 may then drive a signal through capacitor C2 and diode D2 to the connector pin.

When the high-speed output is active, care should be taken to avoid reflections through the DisplayPort path that can interfere with the output signal as the connector pin. For this reason, an embodiment of the present invention may include an additional pad P1 between capacitor C2 and diode D2 as shown. This pad P1 may be formed of a resistor pi or t-network or other appropriate attenuator.

When the high-speed output is active, signals at the connector pin may pass through diode D2, which is off, then through pad P1 and capacitor C2, thereby appearing at an output of DisplayPort buffer B2, which is off. Although at such times DisplayPort driver B2 is off, some signal may reflect at its output, and travel forward again through capacitor C2, Pad P1, and diode D2, appearing at the connector pin and interfering with the desired signal.

In a specific embodiment of the present invention, an off diode D2 provides approximately 6 dB of attenuation to the return signal. Pad P1 may provide an additional 4 dB attenuation, while DisplayPort buffer B2 may provide an additional 10 dB of signal reduction, as it reflects the signal and sends it forward. As the signal travels forward, it re-encounters pad P1 and diode D2, and is again reduced by their attenuation. In this way, reflected signals pass through pad P1 twice, and are thereby attenuated twice. When the DisplayPort output B2 is active, pad P1 does attenuate the signal, but only once. Accordingly, in various embodiments of the present invention, DisplayPort buffer B2 has an increased drive strength to account for the loss due to pad P1.

In a specific embodiment of the present invention, the high-speed output is approximately twice as fast as the DisplayPort output. In such a situation, a pad, such as P1, is not needed in the high-speed transmit path, though it may be included.

In various examples, such as FIG. 8A, the signal paths are shown as single-ended for clarity. In various embodiments of the present invention, the signal paths may be single-ended or differential.

In FIG. 8B, a high-speed input may share a pin with an auxiliary input. As before, the high-speed input may be AC coupled by capacitor C1 to provide a DC block. The auxiliary input pin may be isolated through inductor L1, which may block AC signals while allowing DC signals to pass. An additional capacitor C2 may be included to provide further filtering, as shown. As before, the AUX signal path may be AC coupled through capacitor C3, as shown.

In some embodiments of the present invention, the auxiliary signal may be an I2C signal. In such a case, loading caused by capacitors C1 and input resistance of buffer B1 may be sufficient to overload the driver providing the I2C signal and cause errors in I2C signal transmission. Accordingly, embodiments of the present invention may include a PiN diode D1 as shown. This pin diode may be used to isolate capacitor C1 when it is not needed.

Specifically, when I2C signals are received, the bias signal HSBIAS may be inactive (low), which drives the output of buffer B2 low. This, in turn, may turn off diode D1, thereby isolating the I2C signals from capacitor C1. Multiplexer M1 may select the I2C line.

Similarly, when AUX signals are received, HSBIAS may again be low, which may isolate capacitor C1 from the AUX line. Multiplexer M1 may select the AUX signal path, which again may be AC coupled through capacitor C3.

When high-speed signals are received, HSBIAS may be active (high), thereby driving the output of buffer B2 high. Multiplexer M1 may select resistor R3, which provides a return path for the current provided through D1 from the output of buffer B2. This may turn on diode D1 and may couple a connector pin to capacitor C1 for reception of the high-speed signals.

Various displays may include a dedicated cable that is attached as part of the display. These may be referred to as tethered cables. Tethered cables may be used for DisplayPort monitors or for HSIO monitors, among other types of monitors. Also, these cables may be driven by DisplayPort or HSIO sources. Accordingly, it is desirable for these devices to be able to determine what they are connected to so that they may properly configure themselves. An example of this is shown in the following figure.

FIG. 9 illustrates circuits and methods used by devices in determining what type of devices they are connected to. In line 910, a DisplayPort source or host communicates with a DisplayPort sink or endpoint. Again, configuration pins CFG1 and CFG2 are pulled down. The tethered cable may be a passive cable, and the DisplayPort sink or endpoint may operate as a DisplayPort device.

In line 920, a DisplayPort source or host communicates with an HSIO sink or endpoint. Since the sink or endpoint is an HSIO device, the tethered cable is active. However, since the source or host is a DisplayPort device, the tethered cable may operate in a bypass mode to save power. That is, the included clock and data recovery circuits may be inactive. Since the HSIO sink or endpoint does not detect and pull up on an LSx pin (which may be the LSR2P TX pin), it may operate in a DisplayPort mode. The HSIO sink may also drive CFG2 low.

In line 930, the source or host is an HSIO device, while the sink or endpoint is a DisplayPort device. The HSIO source or host provides pull downs on the CFG1 and CFG2 lines.

In this example, the pull-down resistors have a value of 1 Meg, though other resisters may be used consistent with embodiments of the present invention. The HSIO source or host determines that the voltage on configuration pin CFG2 is low (that is, there is no pull-up), and that CFG1 is also low (therefore, the cable is not an adapter). Therefore, the HSIO source or host operates in a DisplayPort mode.

In line 940, an HSIO source or host communicates with an HSIO sink or endpoint. As before, the HSIO source or host provides pull ups on an LSx pin, and pull downs on configuration pins CFG1 and CFG2. The HSIO sink or endpoint detects the pull-up on the LSx pin, and therefore operates as an HSIO device. In this example, the sink or display may provide a 100 K pull-up on the CFG2, though in other embodiments of the present invention, other sized resistors may be used. Accordingly, the HSIO source or host detects that the voltage on pin CFG2 is high, and therefore operates as an HSIO device.

In a particular embodiment of the present invention, a tethered cable has a plug that may include circuitry, as well as a Y-cable, which may include additional circuitry. In other embodiments of the present invention, all of the circuitry may be included in the plug or the Y-cable portion of the tethered cable. One example is shown in the following figure.

Figure 10:
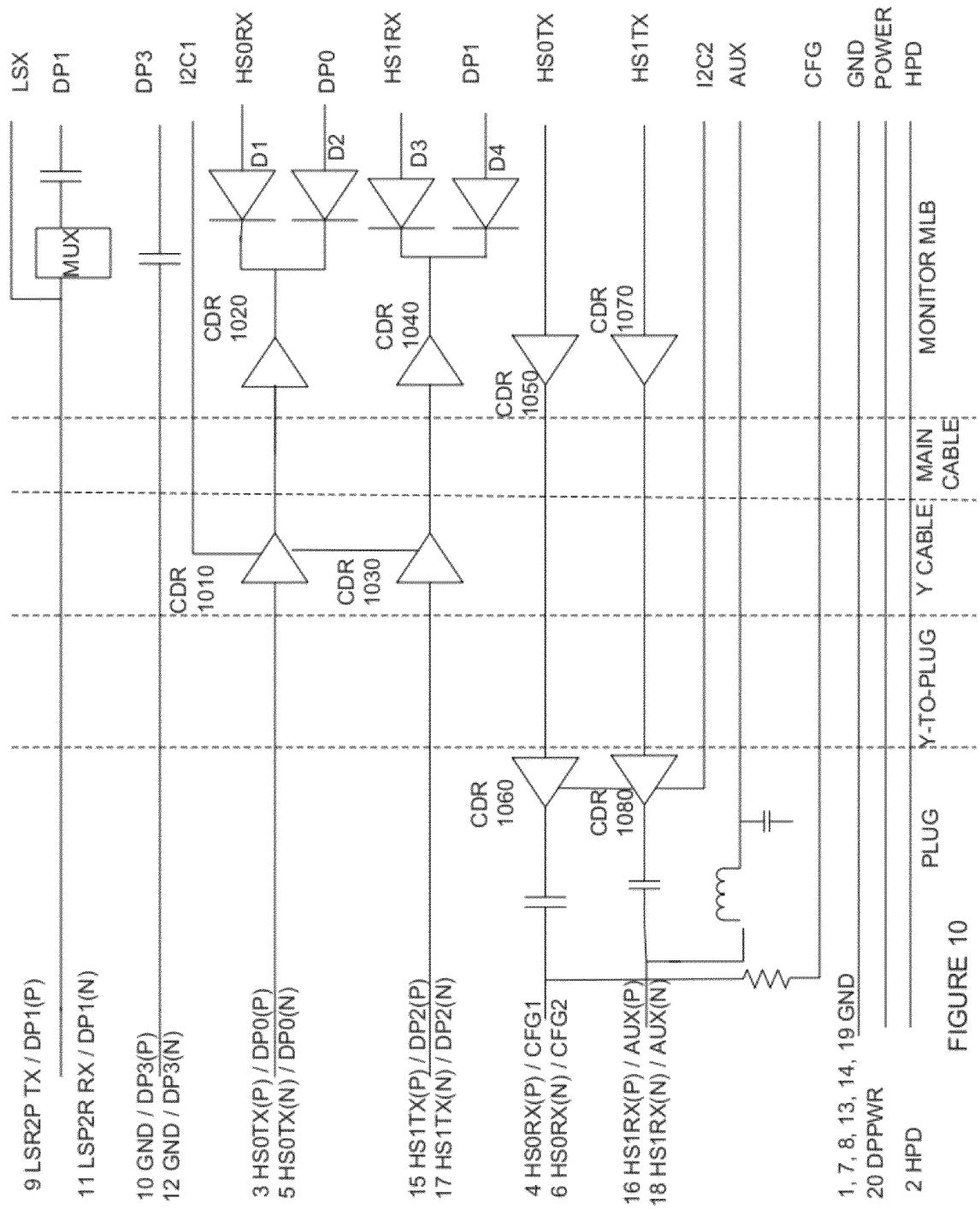
FIG. 10 illustrates circuitry for a tethered cable according to an embodiment of the present invention.

FIG. 10 illustrates circuitry for a tethered cable according to an embodiment of the present invention. A plug is provided for insertion into a connector, such as the connector shown in FIG. 2. The plug is attached to a plug to Y-cable portion, which connects to a Y-cable housing portion, which further includes circuitry. From there the Y-cable attaches to a monitor multilayer board.

In this example, high-speed signals are received by the monitor via clock and data recovery circuits 1010 and 1030, which may be located in a Y-cable housing. The outputs of these clock and data recovery circuits are provided to clock and data recovery circuits 1020 and 1040. The outputs of clock and data recovery circuits 1020 and 1040 are provided by PiN diodes D1-D4 as HSIO or DisplayPort signals. Note that biasing resistors for the PiN diodes D1-D4 in this figure have been omitted for clarity. Again, when the cable is acting to provide DisplayPort signals, the clock and data recovery circuits may operate in a bypass mode to save power. Similarly, high-speed signals provided from the monitor clock and data recovery circuits 1050 and 1070 are received and provided to the connector via clock and data recovery circuits 1060 and 1080 in the plug. The signals may be isolated as shown.

In the example shown, PiN diodes D1-D4 are used to isolate HSIO and DisplayPort signals. In other embodiments of the present invention, resistors, multiplexers, or other circuits or components may be used.

In various embodiments of the present invention, the reliability and accuracy of data connections may be improved by calibrating or training circuitry in the hosts, cables, and other devices. This circuitry may include circuits to compensate for cable skew, cross talk (particularly in a connector), channel compensation (such as equalization or cancellation of reflections), and other such circuitry. These circuits may be adjusted using various parameters. In various embodiments of the present invention, parameters for these circuits may be calibrated or otherwise determined by the manufacture and stored as presets for loading during operation. In other embodiments of the present invention, these parameters may be determined while the system is connected. This training or calibration may occur during power up, restart, or other periodical or event-based time. These or other routines may be used to calibrate the path from a host to a near end of the cable, the path through the cable, and the path from the cable to a device or other host.

This calibration may be performed in various ways. For example, a host may put a near end of the cable in loopback mode, transmit data, and receive the data, and then adjust transmit and receive parameters accordingly. Similarly, a device may put its near end of the cable in loopback mode, transmit data, and receive data, and then adjust transmit and receive parameters accordingly. Either or both the host or device may also place their far end in the loopback mode, thereby also including the cable in the calibration routine. An example is shown in the following figure.

Figure 11:
FIG. 11 illustrates a method of calibrating a cable and related circuitry according to an embodiment of the present invention.

FIG. 11 illustrates a method of calibrating a cable and related circuitry according to an embodiment of the present invention. In act 1110, the calibration or training procedure begins. This may be triggered by a power up, cable connection, reset condition, or other periodic or event driven criteria. In act 1120, a near-end of the cable is placed in loopback mode. A signal is transmitted and received via the loopback path in act 1130. Transmit and receive parameters for the near-end circuits may be optimized in act 1140. In act 1150, the far-end of the cable may be placed in loopback mode. Again, a signal may be transmitted and received via this loopback path in act 1160. Transmit and receive parameters for the far-end circuits may be optimized in act 1170. This procedure may be performed by either or both the host and device circuits.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An active cable comprising:
   a cable;
   a first plug connected to a first end of the cable and comprising:
      a first clock and data recovery circuit to retime signals received at an input of the first plug;
      a second clock and data recovery circuit to retime signals received from the cable; and
      a first microcontroller to configure the first clock and data recovery circuit and the second clock and data recovery circuit; and
   a second plug connected to a second end of the cable and comprising:
      a third clock and data recovery circuit to retime signals received at an input of the second plug;
      a fourth clock and data recovery circuit to retime signals received from the cable; and
      a second microcontroller to configure the third clock and data recovery circuit and the fourth clock and data recovery circuit.

2. The active cable of claim 1 wherein the cable connects an output of the first clock and data recovery circuit to an input of the fourth clock and data recovery circuit and an output of the third clock and data recovery circuit to an input of the second clock and data recovery circuit.

3. The active cable of claim 1 wherein the first microcontroller and the second microcontroller are programmable using pins on the first plug and the second plug.

4. The active cable of claim 1 wherein the first clock and data recovery circuit includes an equalizer circuit.

5. The active cable of claim 1 wherein the first clock and data recovery circuit comprises a de-emphasis circuit.

6. A cable assembly comprising:
   a cable;
   a first plug coupled to a first end of the cable and comprising first circuitry to receive and transmit signals; and
   a second plug coupled to a second end of the cable and comprising second circuitry to receive and transmit signals,
   wherein when the cable conveys signals consistent with a first protocol, the first circuitry and the second circuitry are powered, and when the cable conveys signals consistent with a second protocol, the first circuitry and the second circuitry are not powered.

7. The cable assembly of claim 6 wherein the first circuitry comprises a first clock and data recovery circuit having an input coupled to pins of the first plug and a second clock and data recovery circuit coupled to conductors in the cable.

8. The cable assembly of claim 7 further comprising a microcontroller to configure the first clock and data recovery circuit and the second clock and data recovery circuit.

9. The cable assembly of claim 8 wherein the microcontroller can be programmed using at least one pin of the first plug.

10. The cable assembly of claim 9 wherein the microcontroller can be programmed using code provided at the at least one pin of the first plug.

11. The cable assembly of claim 10 wherein the code is encrypted.

12. An electronic device comprising:
    a connector including a plurality of pins;
    a first output circuit coupled to a first pin in the plurality of pins and comprising:
       a selection circuit coupled to the first pin;
       a first driver AC coupled to the selection circuit; and
       a second driver AC coupled to an attenuator, the attenuator coupled to the selection circuit.

13. The electronic device of claim 12 wherein the connector is a connector insert.

14. The electronic device of claim 12 wherein the connector is a connector receptacle.

15. The electronic device of claim 12 wherein the attenuator is a pi network.

16. The electronic device of claim 12 wherein the selection circuit comprises a plurality of PiN-diodes.

17. The electronic device of claim 12 wherein the selection circuit comprises a multiplexer.

18. The electronic device of claim 12 further comprising a receive circuit comprising:
    a first switch having a first terminal coupled to a second pin in the plurality of pins;
    a receive circuit AC coupled to a second terminal of the first switch;
    an inductor having a first terminal coupled to the second pin; and
    a capacitor coupled between a second terminal of the inductor and ground.

19. The electronic device of claim 18 further comprising a multiplexer coupled to the second terminal of the inductor.

20. The electronic device of claim 18 wherein the switch comprises a PiN-diode.

* * * * *